United States Patent [19]

Scholl

[11] 3,800,637
[45] Apr. 2, 1974

[54] BORING AND FACING APPARATUS

[76] Inventor: Jule A. Scholl, 41-31 51st St., Woodside, N.Y. 11232

[22] Filed: Jan. 11, 1973

[21] Appl. No.: 322,772

Related U.S. Application Data

[62] Division of Ser. No. 127,136, March 23, 1971, Pat. No. 3,744,356.

[52] U.S. Cl. .............................................. 82/34 D
[51] Int. Cl. .......................................... B23b 25/06
[58] Field of Search ......................... 82/34 D, 34 A

[56] References Cited
UNITED STATES PATENTS

| | | | |
|---|---|---|---|
| 3,492,897 | 2/1970 | Cunningham et al. | 82/34 D |
| 1,121,068 | 12/1914 | Chard | 82/34 A |
| 1,686,743 | 10/1928 | Dull | 82/34 D |
| 3,344,693 | 10/1967 | Scholl | 82/1 |

Primary Examiner—Leonidas Vlachos
Attorney, Agent, or Firm—Brumbaugh, Graves, Donohue & Raymond

[57] ABSTRACT

A cutting tool is carried by a carriage which is slidably engaged by a rotatable body connected to a drive shaft so that the body and carriage rotate together to perform boring and facing operations. The rotational movement of the body relative to a reference member produces transverse sliding movement of the carriage relative to the body thereby increasing the diameter of the circular path followed by the cutting tool. The ratio of transverse movement of the carriage to rotational movement of the body can be altered by rotating the reference member. A mechanism which includes a plurality of carriage stops is provided for arresting the transverse movement of the carriage. This mechanism is indexed by the movement of the carriage to bring successive stops into operative position in sequence.

2 Claims, 6 Drawing Figures

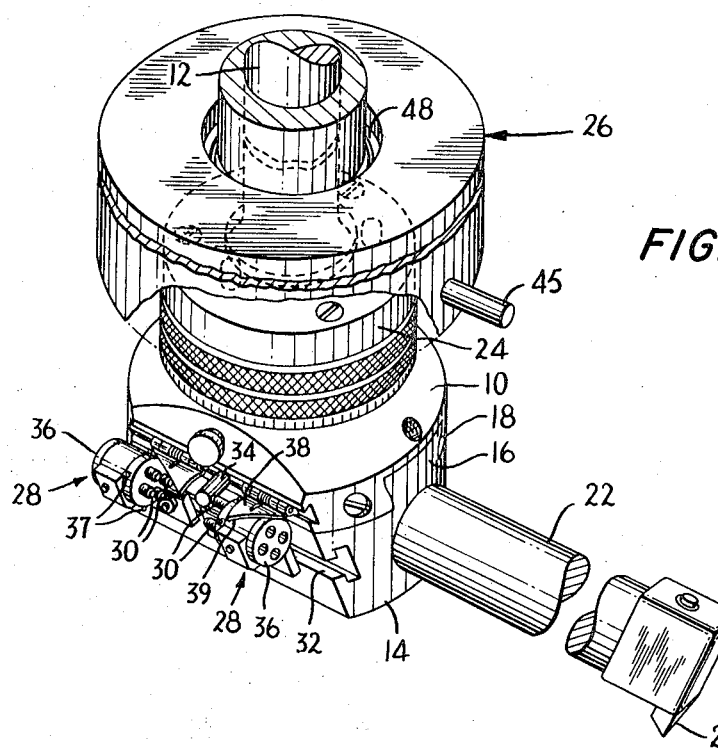
FIG. 1
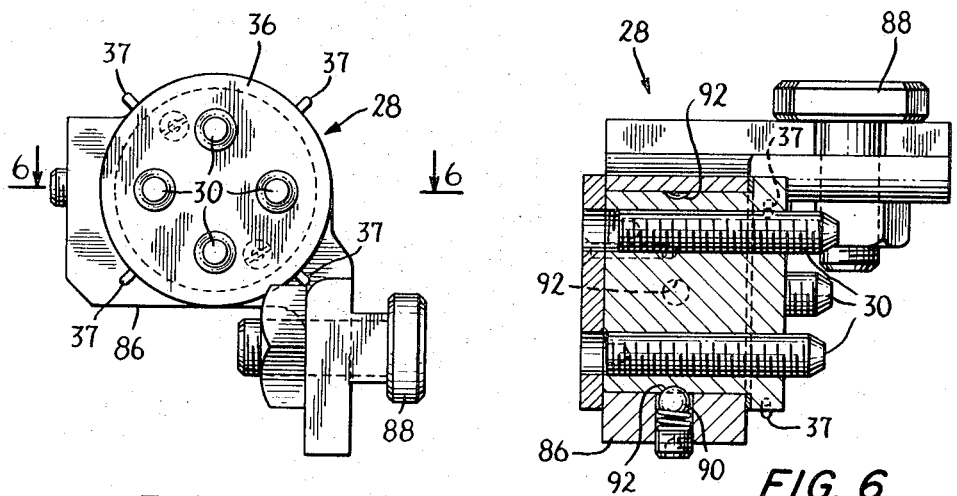
FIG. 5
FIG. 6

BORING AND FACING APPARATUS

This is a divisional, of application Ser. No. 127,136 filed Mar. 23, 1971, now U.S. Pat. No. 3,744,356.

BACKGROUND OF THE INVENTION

This invention relates to boring and facing heads and, more particularly, a new and improved accessory device for incorporation with boring and facing heads by which the ratio of the transverse movement of the cutting tool to the rotational movement of the cutting tool can be continuously varied throughout a wide range.

Boring and facing heads are widely used in machining operations. An example of such heads is described and shown in U.S. Pat. No. 3,371,559, issued to me on Mar. 5, 1968. That apparatus, which is representative, in many respects, of many forms of commercially available devices includes a cylindrical body which can be attached to a drive shaft for rotation therewith. A carriage is supported by the body and slidably engaged by a dove-tailed slot provided in the body. The cutting tool is attached to the carriage by a tool arm. A retaining ring is located above the body and held stationary by a torque arm. As the drive shaft rotates the body, the relative movement between the rotating body and the stationary retaining ring actuates a drive train which produces transverse sliding movement of the carriage relative to the body, thereby progressively increasing the diameter of the generally circular path followed by the cutting tool. Thus, the cutting tool moves in a path of gradually increasing diameter.

Two adjustable stops carried by the carriage engage an abutment (stud) carried by the body after the carriage has moved through a preselected transverse distance. The stops control the extent of the radial advance or retraction of the cutting tool, and the device is then reversed in direction either manually or automatically as disclosed in my U.S. Pat. No. 3,371,559, referred to above.

Although conventional boring and facing heads have been found to be quite satisfactory in use, many have inherent characteristics which have limited their application to some extent. For example, the ratio of transverse movement of the carriage to its rotational movement is determined solely by the gear ratios built into the device. Some commercial heads have complicated gearing that permits several tool feed rates to be set. However, the optimum rate at which the cutting tool should be advanced radially is dependent upon a number of variables such as the hardness of the material being worked upon, the depth of the cut being made, and the type of finished surface desired. Also, and perhaps most important, is the fact that the radial, linear feed rate of the tool is constant for a given gear ratio, and the linear speed of the tool relative to the workpiece increases as the tool feeds outward, assuming a constant spindle speed. Another problem is that the positioning of the stops which stop the carriage at the end of the cut is a somewhat time-consuming operation that requires the attention of a skilled machinist. If it is desired to use the apparatus to perform a series fo operations on a given workpiece, it is necessary to either reset the stops after each operation, or to perform each operation separately in sequence on a series of workpieces.

SUMMARY OF THE INVENTION

The present invention involves a number of important improvements over known boring and facing heads. The basic structure of the head itself is unchanged; it comprises a body adapted to be connected to a drive shaft for rotation therewith and a carriage mounted on and rotatable with the body and arranged for transverse movement with respect to the body of a planetary gear drive. The speed at which the carriage is driven is dependent upon the rotation of a reference number relative to the body.

In accordance with the invention, the reference member may be driven in rotation to control the speed of transverse movement of the carriage relative to the body. The rotation of the reference member is caused by a variable speed electric motor, the speed of which is, in turn, regulated to provide a desired carriage feed rate. The motor may comprise first and second magnetic elements arranged to cooperate with each other. Both of these elements surround the drive shaft atop the body. The first magnetic element is attached to the reference member for rotation therewith and the second magnetic element is maintained in a fixed position. At least one of the two magnetic elements is an electromagnet including a winding connected to a power supply, and the other magnetic element may be a permanent magnet. A direct-current power supply having a continuously variable voltage output is preferred.

A generator may be arranged to continuously monitor the speed of the reference member by producing an electric current proportional to its rotational speed. The generator may include a separate generator winding arranged to rotate with the reference member which interacts with the permanent magnet of the motor. The power supply is made responsive to the current level produced by the generator and varies the power supply voltage applied to the motor accordingly. In this way, the speed of the motor can be continuously adjusted and maintained at the desired level.

Because the speed of rotation of the reference member is monitored and controlled electronically, the apparatus is easily combined with a variety of conventional types of electronic control systems. For instance, the voltage level which is representative of the preselected rotational speed of the reference member could be caused to decrease as the cutting tool advances. Thus, as the tool follows a path of larger diameter and removes more material from the workpiece on each successive revolution, the rate of advance of the carriage can be decreased accordingly so that the rate at which material is removed remains constant.

The apparatus described above may be combined with a carriage-arresting mechanism comprising a plurality of carriage-arresting stops arranged to be positioned in sequence for engagement by an abutment carried by the carriage or the body of the boring and facing apparatus. The arresting mechanism further comprises a movable stop-supporting member that carries the stops and a means for indexing the stop-supporting member to bring a different stop into position to be engaged by the abutment in response to the transverse movement of the carriage. The stop-supporting member may comprise a rotatable cylinder with the stops projecting from one end thereof. The indexing means may comprise a caming surface arranged to engage a projection so as to rotate the stop-supporting member as the carriage moves transversely with respect to the body. The stops may be made adjustable so that the distance by which the project from the stop-supporting member can be varied.

A head embodying the improvements, according to this invention, provides a number of important advantages over previously known heads. By providing for controlled movement of the reference member the ratio between the speed of radial advance of the cutting tool and its speed of rotation can be set at will and altered, preferably continuously throughout a range, in accordance with the desired facing or boring operation. The provision of the automatically indexed carriage-arresting mechanism can account for a very significant savings in time and effort.

BRIEF DESCRIPTION OF THE DRAWINGS

For a more complete understanding of the invention, reference may be had to the following detailed description taken in conjunction with the accompanying figures of the drawings in which:

FIG. 1 is a three-dimensional pictorial view of a boring and facing apparatus combined with a carriage-arresting mechanism constructed in accordance with the invention;

FIG. 5 is an end view of the carriage-arresting mechanism shown in FIG. 1; and

FIG. 6 is a sectional view of the carriage-arresting mechanism of FIG. 5 taken along the line 6—6.

DESCRIPTION OF AN EXEMPLARY EMBODIMENT

Figure 2:
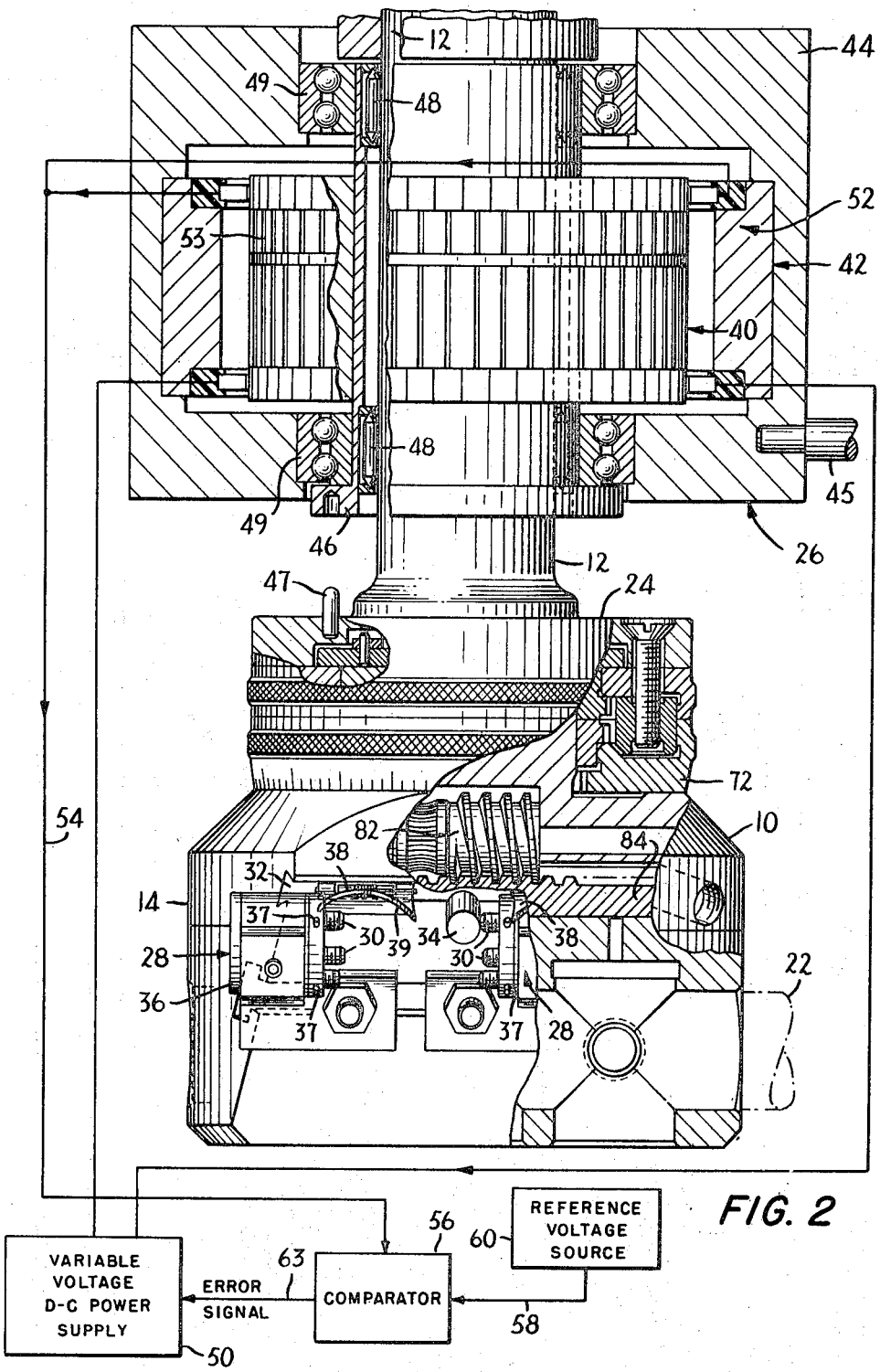
FIG. 2 is a partially sectioned and broken-away exploded side view of the apparatus of FIG. 1.

The improvements, according to the invention, as embodied in the exemplary device shown in the drawings, are employed in a boring and facing head that is, per se, of known construction. The head is described in U.S. Pat. No. 3,371,559 issued to me on Mar. 5, 1965. As shown in FIG. 1, the head includes a body 10 that is connected to a drive shaft 12 for rotation therewith and carries a transversely slidable carriage 14. The top of the carriage 14 has an elongated projecting portion 16 which is received by a dove-tail shaped slot 18 formed in the bottom of the body 10. Thus, the carriage 14 is capable of sliding in the slot 18 to permit transverse movement of the carriage 14 with respect to the body 10. The carriage 14 is adapted to carry a cutting tool 20 to which it is attached by a tool arm 22.

Figure 3:
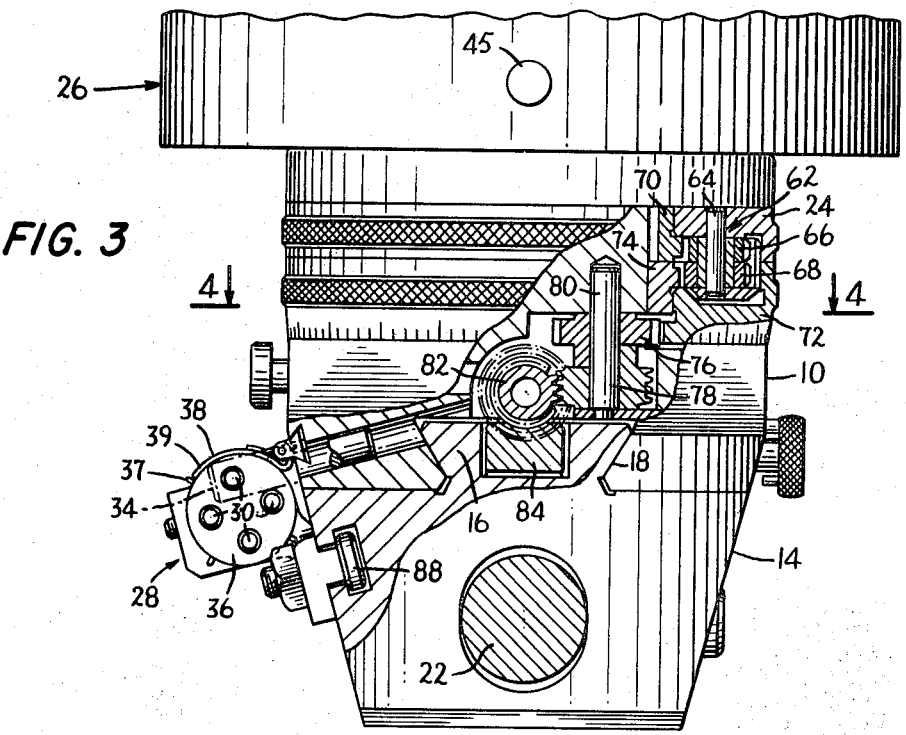
FIG. 3 is another partially broken-away side view of the apparatus of FIG. 1.
Figure 4:
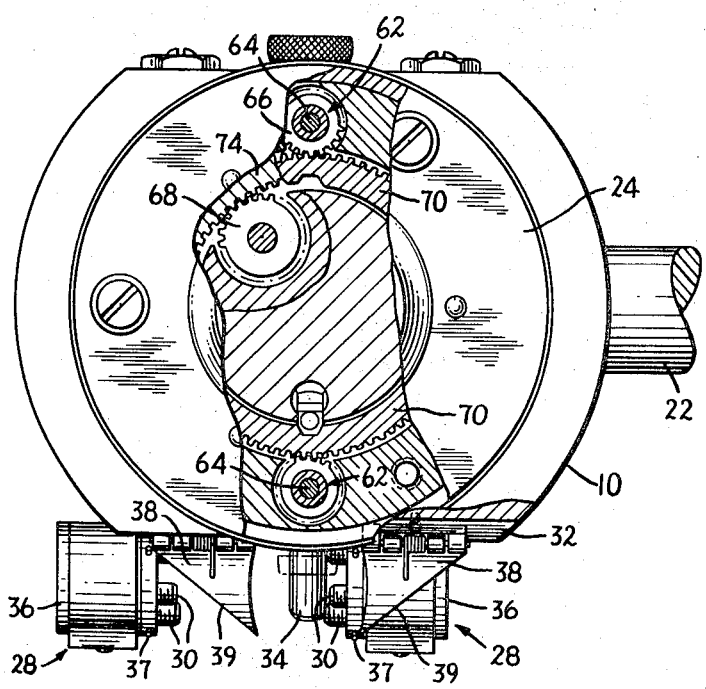
FIG. 4 is a partially broken away top view of a portion of the apparatus of FIG. 1.

A rotatable reference member 24 in the form of a ring or collar is located atop the body 10. The pertinent parts of a gear means associated with the body 10, reference member 24, and carriage 14 for driving the carriage 14 transversely relative to the body 10 upon rotational movement of the body 10 relative to the reference member 24 are shown most clearly in FIGS. 3 and 4. A pair of gear assemblies 62 are disposed within the interior of the body 10. Each of these gear assemblies 62 includes a shaft 64 which extends downwardly from the reference member 24. The shaft 64 carries an upper gear 66 and a lower gear 68. A ring 70 is provided which is lockable to the body 10 for rotation therewith. The ring 70 engages the upper gears 66 of the gear assemblies 62. The gears 66 are locked to and cause the rotation of the lower gears 68. The rotation of the gears 68 causes the rotation of a collar 72 which has an upper portion 74 having outwardly projecting teeth that engage the gears 68. The rotation of the collar 72 causes the rotation of a gear 76, which in turn rotates a gear 78. The gears 76 and 78 are mounted on a common shaft 80 for rotation together. The gear 78 is engaged with and causes the rotation of a worm 82. The rotation of the worm 82 causes the transverse movement of the carriage 14 by its engagement with a rack 84 carried by the upper portion 16 of the carriage 14. This transverse movement of the carriage 14 moves the cutting tool 20 radially, thus feeding it to the workpiece.

A means is provided for rotating the reference member 24 to bring about the transverse movement of the carriage 14 relative to the body 10. This means comprises a variable speed electric motor 26 mounted about the drive shaft 12 atop the body 10. The motor 26 enables the operator to vary the speed of rotation of the reference member 24 over a substantial range. Controls may be provided for setting the speed of the motor 26 at any one of a plurality of preselected speeds or its speed may be made continuously variable.

The motor 26 includes first magnetic element, a rotor 40, which is attached to the drive shaft 12 for rotation therewith, and a second magnetic element, a stator 42, which is attached to a stationary frame 44 that is held in a fixed position by a torque arm 45. The first magnetic element 40, which is the inner element, is attached to the reference member 24 by a sleeve 46 which has a flange portion that engages a pin 47 carried by the upper surface of the reference member 24. A set of needle bearings 48 are provided between the sleeve 46 and the shaft 12. A set of ball bearings 49 are provided between the sleeve 46 and the stationary frame 44.

The relative rotational speed of the reference member 24 with respect to the body 10 and the drive shaft 12 can, of course, be controlled by varying the speed of the first and second magnetic elements 40 and 42 which determine the absolute speed of the reference member 24. The difference in the rotational speeds of the reference member 24 and the body 10 is ultimately translated into the transverse movement of the carriage 14 and the cutting tool 20.

In its preferred form, the motor 26 is a conventional type of variable speed direct-current motor in which the magnetic element 42 is made up of a plurality of permanent magnets and the other magnetic element 40 is made up of a set of electrical windings which form an electro-magnet. This arrangement is desirable because of its simplicity and accuracy, and because it renders unnecessary the connection of one of the magnetic elements 40, 42 to a power supply 50. The power supply 50 is of the variable voltage direct-current type. Thus, the rotational speed of the reference member 24 is dependent upon the voltage output of the power supply 50. The voltage is adjusted until the speed of the reference member 24 relative to the body 10 causes the desired rate of tool advance. Preferably, the motor 26 is reversible so that the reference member 24 can be rotated in the same direction as the shaft 12, but at a higher speed. This reverses the direction of rotation of the reference member 24 relative to the body 10 and thus causes the cutting tool 20 to be retracted.

Although the operator of the apparatus may select the speed of rotation of the member 24 by directly setting the voltage output of the power supply 50, it is desirable to provide for automatic regulation of the power-supply voltage to maintain a selected motor speed and corresponding rate of transverse movement of the carriage 14. This can be accomplished by a generator 52 which is integrally formed with the motor 26. For this purpose, a separate set of windings 53 is provided as part of the electro-magnetic element 40. The windings 53 cooperate with the permanent magnets of the stator element 42 to produce a current which is carried by a line 54 to a comparator 56. The comparator 56 also receives an input through a line 58 from a reference-voltage source 60. The comparator 56 compares the signal from the generator 52 with the signal from the reference-voltage source 60 and produces an error signal proportional to the difference therebetween. In this way the speed of the reference member 24 is monitored continuously. The error signal is supplied by a line 63 to the power supply 50, and the power supply voltage is adjusted upwardly or downwardly in accordance with the polarity of the error signal. Thus, the generator 52 functions as a tachometer and measures the speed of rotation of the reference member 24 which is indicated by the signal transmitted through the line 54. The wire which connects the motor 26 to the comparator 56 and the power supply 50 can be carried by the torque arm 45, which is made hollow for this purpose.

The operator of the apparatus selects the level of the reference-voltage of the source 50 which corresponds to the output of the generator 52 at the rotational speed that produces the rate of transverse carriage movement he desires. In this way he determines the rate of radial advance of the cutting tool 20, and this speed of radial advance does not bear a fixed ratio to the speed of rotation of the drive shaft 12, as is the case when prior art devices are utilized. It is possible to vary the level of the reference signal in any conventional manner to program changes in the speed of radial advance according to any desired pattern. For instance, the speed of advance can be decreased as the diameter of the path followed by the cutting tool 20 increases to maintain a constant rate of metal removal.

The respective positions of the permanent-magnet element 42 and the electro-magnetic element 40 can, of course, be reversed, i.e., the permanent magnet element 42 can be mounted on the reference member 24 as the rotor, and the electro-magnet 40 can be attached to the frame 44 as the stator. This will, under some circumstances, make the electrical contacts for the windings of the motor 26 and the generator 52 more easily accessible. Other types of electric motors, such as a pulsed D-C motor, may be used in place of an electric motor of the type desired above. Moreover, it is not essential, although it is preferred, that the electrical motor 26 be mounted about the drive shaft 12 and atop the body 10 as shown in the drawings. The motor 26 can be mounted on an adjacent supporting member and connected by gears and shafts to the reference member 24. This placement of the motor 26 could be used with or without a cooperating generator-tachometer 52.

The boring and facing head described above may advantageously be employed in combination with a pair of carriage-arresting mechanisms 28, as shown in FIG. 1. Both of these mechanisms 28 are engaged by a slot 32 in the carriage 14 of the boring and facing apparatus. It would be possible, if desired, to use a single carriage-arresting mechanism 28 and a conventional fixed-position stop could be employed at the other end of the carriage's line of travel.

A carriage-arresting mechanism 28 is shown separately in FIGS. 5 and 6. It includes the four adjustable stops 30 that are held by the movable stop-supporting member 36. The member 36, which is generally cylindrical in shape, is rotatably held by a frame 86 which is secured in the slot 32 of the carriage 14 by a fastening bolt 88. A ball 90 is spring biased against the side of the rotational member 36 and is adapted to engage one of four detents 92 on the side of the member 36. Thus, depending upon which of the detents 92 is engaged by the ball 90, any one of the four stops 30 may be operatively positioned for engagement by the abutment 34 carried by the body 10.

It is desired to have the abutment 34 contact one of the four stops 30, in sequence, on each successive engagement with the carriage-arresting mechanism 28. Therefore, a means is provided for indexing the stop-supporting member 36 to bring a different stop 30 into position to be engaged by the abutment 34 in response to the transverse movement of the carriage 14. This means comprises the plurality of projections 37 provided on the rotatable member 36. One of the projections 37 corresponds to each of the stops 30. As the carriage 14 is advanced, one of the projections 37 is engaged by the caming surface 39 which displaces the projection 37 so that it rotates away from the carriage 14 as the abutment 34 moves towards the carriage-arresting mechanism 28. This rotates the member 36 to bring the next successive stop 30 into operative position to be engaged by the abutment 34. The engagement of the stop 30 by the abutment 34 halts the transverse movement of the carriage 14. The direction of movement of the carriage 14 is then reversed, as explained in my U.S. Pat. No. 3,371,559, and it moves transversely again until the abutment 34 engages the other carriage-arresting mechanism 28 repeating the operation described above.

The principle upon which the carriage-arresting mechanism 28 operates is dependent upon relative movement between the carriage-arresting mechanism 28 and the abutment 34. It would be possible to modify the embodiment described above by mounting the carriage-arresting mechanism 28 on the body 10 and mounting the abutment 34 on the carriage 14. Whichever arrangement is chosen, the carriage-arresting mechanism 28 causes the cutting tool 20 to cease being fed into the workpiece or to cease being retracted from the workpiece after it has moved through a predetermined distance selected by presetting the extent to which the stops 30 project from the end of the stop-supporting member 36. Because the stop-supporting member 36 is automatically indexed before each engagement by the abutment 34, it is possible for a machinist to select four different stopping positions at which the transverse movement of the carriage 14 will be reversed after four successive transverse movements. Although four stops have been provided in each carriage-arresting member 28 of this embodiment, it would, of course, be possible to use a different number of stops depending upon the operation to be performed.

Of course, the concept of controlling the speed of the reference member 24 as described here can be employed without using the above-described carriage-arresting mechanism 28. For instance, a known type of electronic transducer that senses the position of the carriage 14 could be employed to produce an electrical signal at the proper time. This signal could cause a reversal of either the drive shaft 12 or the motor 26. If the motor 26 is used to retract the tool 20, this can be accomplished while the drive shaft 12 is not in operation. Previously known arrangements require that the drive shaft 12 being turned, and thus the tool 20 rotated, in order to retract the tool.

In summary, the apparatus of this invention includes two principal advantages as compared to prior art devices. The first advantage is that the ratio of the speed at which the cutting tool 20 is fed to the workpiece can be varied in accordance with the selected speed of the electric motor 26 and it is not dependent upon the speed of rotation of the drive shaft 12. The other advantage is that the transverse movement of the carriage 14 can be halted at four different positions sequentially in each direction of movement because of the provision for automatically indexing carriage-arresting mechanism 28.

It will be apparent to those skilled in the art that the above-described embodiment is meant to be merely exemplary and that it is susceptible to modification and variation without departing from the spirit and scope of the invention. Therefore, the invention is not deemed to be limited except as defined by the appended claims.

I claim:

1. In a boring and facing apparatus having a body adapted to be connected to a rotary drive shaft for rotation therewith, a carriage slidably carried by the body for rotation with and transverse movement relative to the body, means on the carriage for mounting a tool, a reference member mounted on the body for rotation relative to the body, and gear means coupled between the body, reference member, and carriage for driving the carriage transversely relative to the body upon rotational movement of the body relative to the reference member, the improvement in combination therewith of a carriage-arresting mechanism comprising a frame mounted on the carriage, a stop-supporting member including a rotatable cylinder carried by the frame for rotation about an axis substantially parallel to the axis of movement of the carriage relative to the body, a plurality of carriage-arresting stops projecting from the rotatable cylinder substantially parallel to the axis of the rotatable cylinder and uniformly spaced from the cylinder and from each other, each stop being adjustable as to the distance it projects from the cylinder, an abutment affixed on the body and engageable by one of the carriage-arresting stops upon movement of the carriage to a predetermined stop position relative to the body, a cam-follower projection corresponding to each of the carriage-arresting stops and extending generally outwardly from the rotatable cylinder, the projection being spaced an equal distance from each other and from the axis of the rotatable cylinder, and means defining a camming surface on the body positioned to engage one of the cam-follower projections upon movement of the carriage relative to the body for automatically upon such engagement with a projection rotating the cylinder to shift one stop out of position for engagement with the abutment and to shift an adjacent stop into position for engagement with the abutment.

2. Apparatus according to claim 1 and further comprising detent means coacting between the frame and cylinder of the carriage-arresting mechanism for positioning the cylinder relative to the frame accurately to locate each carriage-arresting stop in predetermined position for engagement with the abutment.

* * * * *